(12) United States Patent
Smith et al.

(10) Patent No.: US 9,415,888 B2
(45) Date of Patent: Aug. 16, 2016

(54) NET WRAPPING SYSTEM BACK WRAP ROLL

(71) Applicant: CNH AMERICA LLC, New Holland, PA (US)

(72) Inventors: Kevin M. Smith, Narvon, PA (US); Bram Rosseel, Snellegem (BE); Scott C. Simmons, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 693 days.

(21) Appl. No.: 13/838,953

(22) Filed: Mar. 15, 2013

(65) Prior Publication Data

US 2014/0260090 A1 Sep. 18, 2014

(51) Int. Cl.
*B65B 27/12* (2006.01)
*A01F 15/07* (2006.01)

(52) U.S. Cl.
CPC ........... *B65B 27/125* (2013.01); *A01F 15/0715* (2013.01)

(58) Field of Classification Search
CPC ... B65B 27/125; A01F 15/0715; A01F 15/07; A01F 15/071; A01F 2015/072
USPC .......... 53/397, 587, 389.1, 389.2, 389.4, 211, 53/465
See application file for complete search history.

(56) References Cited

U.S. PATENT DOCUMENTS

| | | | | |
|---|---|---|---|---|
| 4,466,577 A * | 8/1984 | Heinz | ................ | B65H 19/1868 242/541 |
| 4,697,402 A * | 10/1987 | Anstey | ................ | A01F 15/0715 53/118 |
| 4,729,213 A * | 3/1988 | Raes | ................... | A01F 15/0715 100/15 |
| 4,896,477 A * | 1/1990 | Wagstaff | ............ | A01F 15/0715 53/118 |
| 4,956,968 A * | 9/1990 | Underhill | ........... | A01F 15/0715 100/88 |
| 5,005,747 A | 4/1991 | Anstey | | |
| 5,129,207 A * | 7/1992 | Butler | ................. | A01F 15/0715 53/118 |
| 5,230,193 A | 7/1993 | Underhill et al. | | |
| 5,319,899 A * | 6/1994 | Jennings | ............ | A01F 15/0715 53/118 |
| 5,433,059 A * | 7/1995 | Kluver | ............... | A01F 15/0715 53/118 |
| 5,687,548 A * | 11/1997 | McClure | ............ | A01F 15/0715 53/118 |
| 6,550,218 B2 * | 4/2003 | McClure | ............ | A01F 15/0715 53/118 |
| 6,622,463 B1 | 9/2003 | Anstey et al. | | |
| 7,334,382 B2 | 2/2008 | Smith | | |
| 7,464,523 B2 * | 12/2008 | Vande Ryse | ........ | A01F 15/0715 53/201 |
| 2004/0055268 A1* | 3/2004 | Schuster | ............ | A01F 15/0715 56/341 |
| 2007/0101694 A1 | 5/2007 | Hood et al. | | |
| 2007/0157556 A1* | 7/2007 | Feraboli | .............. | A01F 15/0715 53/399 |
| 2010/0162676 A1* | 7/2010 | Simmons | ........... | A01F 15/0715 56/341 |
| 2012/0152132 A1 | 6/2012 | Kraus et al. | | |

FOREIGN PATENT DOCUMENTS

| | | |
|---|---|---|
| DE | 4012739 C2 | 6/1995 |
| EP | 1769673 A1 | 4/2007 |
| EP | 1808065 A1 | 7/2007 |

\* cited by examiner

*Primary Examiner* — Thanh Truong
*Assistant Examiner* — Thomas M Wittenschlaeger
(74) *Attorney, Agent, or Firm* — Patrick M. Sheldrake (57) ABSTRACT

A net wrapping system includes an insertion assembly configured to move between a home position and an insert position. The insertion assembly has at least one insertion assembly spreader roll configured to engage net wrapping from a net roll. The net wrapping system also includes a fixed spreader roll proximate to the net roll and configured to engage the net wrapping along a length of the fixed spreader roll circumferential surface when the insertion assembly is in the home position. The net wrapping system further includes a back wrap roll located along a net path between the fixed spreader roll and the at least one insertion assembly spreader roll and configured to cause the net wrapping to maintain engagement with substantially the same length of the fixed spreader roll circumferential surface when the insertion assembly is in the insert position.

15 Claims, 5 Drawing Sheets

NET WRAPPING SYSTEM BACK WRAP ROLL

TECHNOLOGY FIELD

The present disclosure relates generally to feeding net wrapping from net rolls in a baler, and particularly to a back wrap roll to facilitate the feeding of the net wrapping from the net rolls in a baler.

BACKGROUND

Agricultural balers have been used to consolidate and package crop material to facilitate the storage and handling of the crop material for later use. Typically, a mower-conditioner cuts and conditions the crop material for windrow drying in the sun. When the cut crop material is properly dried, a baler, for example a round baler, the most frequently used in industry, travels along the windrows to pick up the crop material and form the material into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by net wrapping or other wrapping such as plastic wrapping and wire. After the round bale is wrapped, the back of the baler, or tailgate, opens and the wrapped bale is discharged.

The net wrapping bound onto the bale is fed from a net roll and into a net wrapper assembly, conventionally located in the front of the baler. The net wrapping is then wrapped around a circumference of the bale in the bale chamber. Conventional net wrapping systems include a series of spreader rolls that extend between opposing sides of the baler and engage the net wrapping as the net wrapping is fed through the net wrapper assembly to the bale. The engagement of the net wrapping with these spreader rolls attempts to cause the net wrapping to be moved outward toward the opposing sides of the baler to maintain the width of the net wrapping as it traverses through the net wrapper assembly to be wrapped across the width of the bale. During operation of these conventional net wrapping systems, however, it may become difficult to maintain the width of the net wrapping as it traverses through the net wrapper assembly. An improved method and system for feeding net wrapping to wrap a bale is needed.

SUMMARY

Embodiments are directed to a baler including a bale chamber configured to house a bale and a net wrapping system configured to feed net wrapping from a net roll to the bale. The net wrapping system includes an insertion assembly configured to move between a home position and an insert position. The insertion assembly has at least one insertion assembly spreader roll configured to engage the net wrapping on an insertion assembly spreader roll circumferential surface and move with the insertion assembly between the home position and the insert position. The net wrapping system also includes a fixed spreader roll proximate to the net roll and having a fixed spreader roll circumferential surface. The fixed spreader roll is configured to engage the net wrapping along a length of the fixed spreader roll circumferential surface when the insertion assembly is in the home position. The net wrapping system further includes a back wrap roll located along a net path between the fixed spreader roll and the at least one insertion assembly spreader roll and configured to cause the net wrapping to maintain engagement with substantially the same length of the fixed spreader roll circumferential surface when the insertion assembly is in the insert position.

In one embodiment, the net wrapping includes a net wrapping width extending from one end of the net roll to an opposing end of the net roll. The net wrapping traverses a path between the net roll and the bale when the insertion assembly is in the home position. The back wrap roll is configured to cause the net wrapping to maintain the net wrapping width as the net wrapping traverses the path between the net roll and the bale when the insertion assembly is in the home position.

In another embodiment, the rotational length of the fixed spreader roll circumferential surface that is engaged with the net wrapping is a rotational length having a range from about 90 degrees to about 200 degrees. In one aspect, the rotational length of the fixed spreader roll circumferential surface that is engaged with the net wrapping is a rotational length having a range from about 150 degrees to about 180 degrees.

According to an embodiment, the back wrap roll is configured to: (i) engage the net wrapping with a back wrap roll circumferential surface when the insertion assembly is in the insert position; and (ii) disengage from the net wrapping when the insertion assembly is moved from the insert position to the home position.

According to another embodiment, the net wrapping maintains engagement with substantially the same length of the fixed spreader roll circumferential surface when a second length of the fixed spreader roll circumferential surface engaged by the net wrapping in the insert position is equal to or less than a predetermined length threshold from the first length of the fixed spreader roll circumferential surface engaged by the net wrapping in the home position.

According to another embodiment, the back wrap roll is further configured to cause a second net wrapping length extending from the fixed spreader roll to the duck bill assembly when the insertion assembly is in the insert position to remain substantially the same as a first net wrapping length extending from the fixed spreader roll to the duck bill assembly when the insertion assembly is in the home position.

In one aspect of an embodiment, the second net wrapping length remains substantially the same as the first net wrapping length when the second net wrapping length is equal to or less than a predetermined net wrapping length threshold from the first net wrapping length.

Embodiments are directed to a net wrapping system that includes an insertion assembly configured to move between a home position and an insert position. The insertion assembly has at least one insertion assembly spreader roll configured to engage net wrapping from a net roll on a insertion assembly spreader roll circumferential surface and move with the insertion assembly between the home position and the insert position. The net wrapping system also includes a fixed spreader roll proximate to the net roll and having a fixed spreader roll circumferential surface. The fixed spreader roll is configured to engage the net wrapping along a length of the fixed spreader roll circumferential surface when the insertion assembly is in the home position. The net wrapping system further includes a back wrap roll located along a net path between the fixed spreader roll and the at least one insertion assembly spreader roll and configured to cause the net wrapping to maintain engagement with substantially the same length of the fixed spreader roll circumferential surface when the insertion assembly is in the insert position.

In one embodiment, the net wrapping includes a net wrapping width extending from one end of the net roll to an opposing end of the net roll. The net wrapping traverses a path between the net roll and the bale when the insertion assembly is in the home position. The back wrap roll is configured to cause the net wrapping to maintain the net wrapping width as the net wrapping traverses the path between the net roll and the bale when the insertion assembly is in the home position.

According to one aspect of an embodiment, the back wrap roll has a smooth surface.

In another embodiment, the rotational length of the fixed spreader roll circumferential surface that is engaged with the net wrapping is a rotational length having a range from about 90 degrees to about 200 degrees. In one aspect, the rotational length of the fixed spreader roll circumferential surface that is engaged with the net wrapping is a rotational length having a range from about 150 degrees to about 180 degrees.

According to an embodiment, the back wrap roll is configured to: (i) engage the net wrapping with a back wrap roll circumferential surface when the insertion assembly is in the insert position; and (ii) disengage from the net wrapping when the insertion assembly is moved from the insert position to the home position.

According to another embodiment, the net wrapping maintains engagement with substantially the same length of the fixed spreader roll circumferential surface when a second length of the fixed spreader roll circumferential surface engaged by the net wrapping in the insert position is equal to or less than a predetermined length threshold from the first length of the fixed spreader roll circumferential surface engaged by the net wrapping in the home position.

According to another embodiment, the back wrap roll is further configured to cause a second net wrapping length extending from the fixed spreader roll to the duck bill assembly when the insertion assembly is in the insert position to remain substantially the same as a first net wrapping length extending from the fixed spreader roll to the duck bill assembly when the insertion assembly is in the home position.

In one aspect of an embodiment, the second net wrapping length remains substantially the same as the first net wrapping length when the second net wrapping length is equal to or less than a predetermined net wrapping length threshold from the first net wrapping length.

Embodiments are directed to a method of operating a net wrapping system in a baler that includes positioning a insertion assembly having at least one insertion assembly spreader roll in a home position. The method also includes feeding net wrapping from a net roll to a bale in a bale chamber when the insertion assembly spreader roll in a home position by engaging the net wrapping with: (i) a fixed spreader roll along a fixed spreader roll circumferential surface length and (ii) a circumferential surface of a back wrap roll located along a net path between the fixed spreader roll and the at least one insertion assembly spreader roll. The method further includes moving the insertion assembly and the at least one insertion assembly spreader roll to an insert position and causing the net wrapping to maintain engagement along substantially the same fixed spreader roll circumferential surface length when the insertion assembly is in the insert position.

In one embodiment, the method further includes causing the net wrapping to maintain a net wrapping width as the net wrapping traverses a path between the net roll and the bale.

In another embodiment, the method further includes engaging the net wrapping with the back wrap roll circumferential surface when the duck bill assembly is in the insert position and disengaging the net wrapping from the back wrap roll circumferential surface when the insertion assembly is moved from the insert position to the home position.

According to one embodiment, the method further includes causing a second net wrapping length extending from the fixed spreader roll to the duck bill assembly when the insertion assembly is in the insert position to remain substantially the same as a first net wrapping length extending from the fixed spreader roll to the duck bill assembly when the insertion assembly is in the home position.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

As described above, spreader rolls in conventional net wrapping systems engage the net wrapping as the net wrapping is fed through the net wrapper assembly to the bale. These conventional net wrapping systems attempt to cause the net wrapping to be moved outward toward the opposing sides of the baler and maintain the width of the net wrapping by engaging the net wrapping with the spreader rolls. If the net wrapping does not maintain sufficient engagement with a circumferential portion of one or more of the spreader rolls, however, the net wrapping may move inward and away from the opposing sides of the baler causing the net wrapping to be bound across the bale less than the full width of the bale.

Insertion assemblies (e.g., duck bill assemblies) of these conventional net wrapping systems typically move between a home position (the net wrapping is flowing onto the bale) and an insert position (the net wrapping is not flowing onto the bale). A wrap cycle begins with the insertion assembly in the home position and net is not being bound onto the bale. While the insertion assembly is in the home position, the net wrapping is fed through the net wrapping system, engaging a circumferential portion of one or more of the spreader rolls (e.g., a fixed spreader roll that does move between the home position and insert position). When the insertion assembly moves to the insert position, the net starts wrapping on the bale. The net wrapping in the conventional net wrapping systems, however, may not maintain sufficient engagement with a circumferential portion of the fixed spreader roll to maintain the width of the net wrapping. Also, when the duck bill is in the insert position, the net wrapping may be pulled by the bale without being bound onto the bale, causing the net wrapping to stretch and migrate inward away from the opposing sides of the baler. Further, tension is typically applied to the net wrapping by a braking system, when the net wrapping is being bound onto the bale and the duck bill is in the home position. This tension is decreased when the duck bill is in the insert position to allow the bale to grab the net and begin bounding the net onto the bale, causing the spreader rolls to be less effective for maintaining the width of the net wrapping. Therefore, because the net has migrated inward at insert, net wrapping that is less than the width of the bale may be bound onto the bale when the duck bill returns to the home position.

Embodiments of the present invention provide a back wrap roll configured to cause net wrapping to maintain engagement with substantially the same length of the fixed spreader roll circumferential surface when the insertion assembly is in the insert position and in the home position. Embodiments of the present invention cause the net wrapping to maintain a net wrapping width as the net wrapping traverses the path between the net roll and the bale. Embodiments of the present invention cause a net wrapping length or a distance that the net wrapping has to travel to remain substantially the same when the insertion assembly is in the insert position and the home position. Embodiments of the present invention cause the back wrap roll to engage the net wrapping when the insertion assembly is in the insert position and disengage from the net wrapping when the insertion assembly is moved from the insert position to the home position.

Embodiments of the present invention are particularly well suited for, but in no way limited to, use with agricultural balers, such as round balers, for example. Agricultural balers, such as round balers, are well known in the agricultural industry, and the instant invention can be used with substantially any of such machines.

Figure 1:
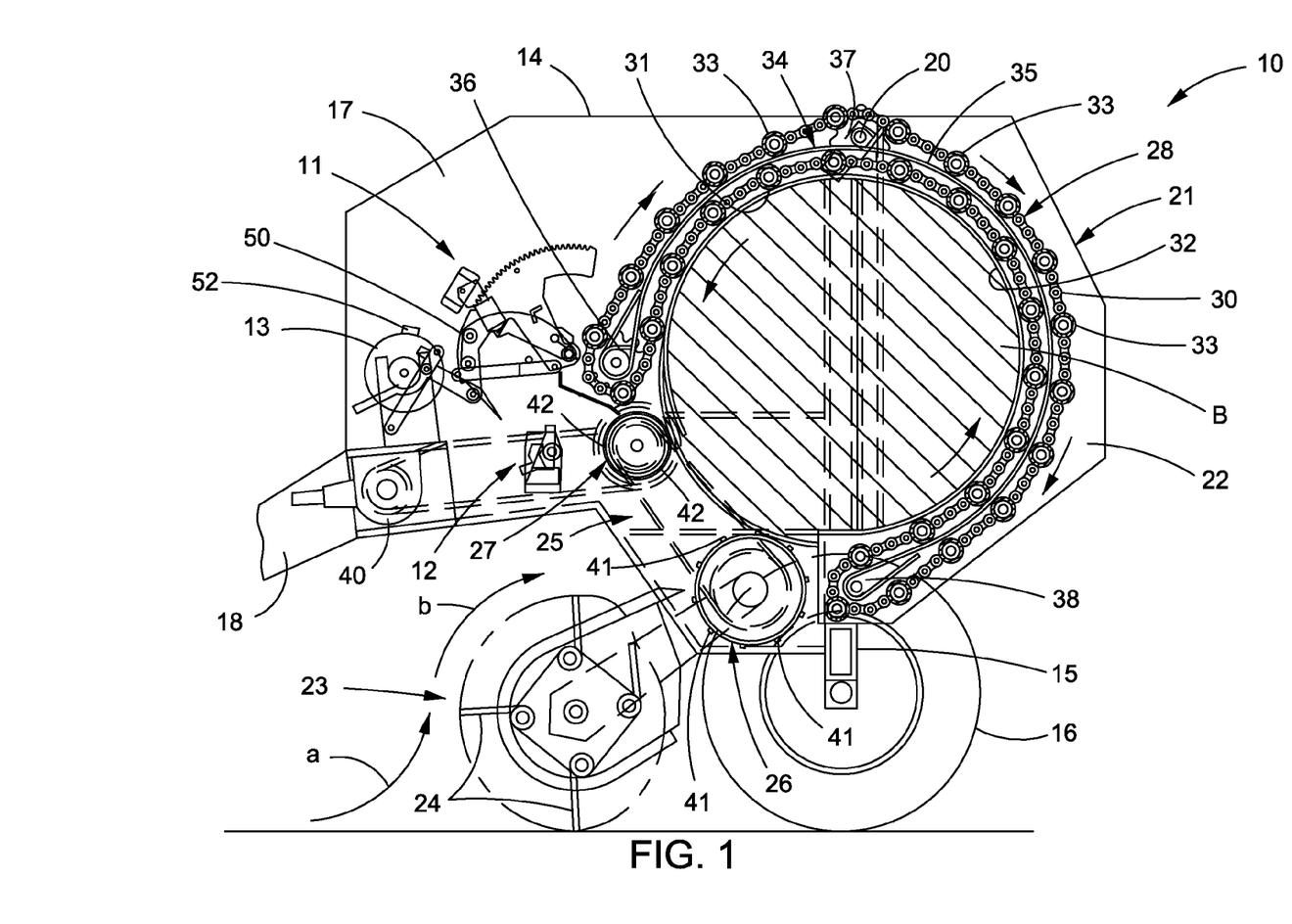
FIG. 1 illustrates an exemplary round baler for use with embodiments of the present invention.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown). FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net wrapping, fed from a net roll 13 through a net feeding assembly 50.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity, only one wall 17 is shown in FIG. 1 and the elements mounted inwardly thereof are shown in full lines for clarity, which is an approach not uncommon in the descriptions in patents. For illustrative purposes, reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2A:
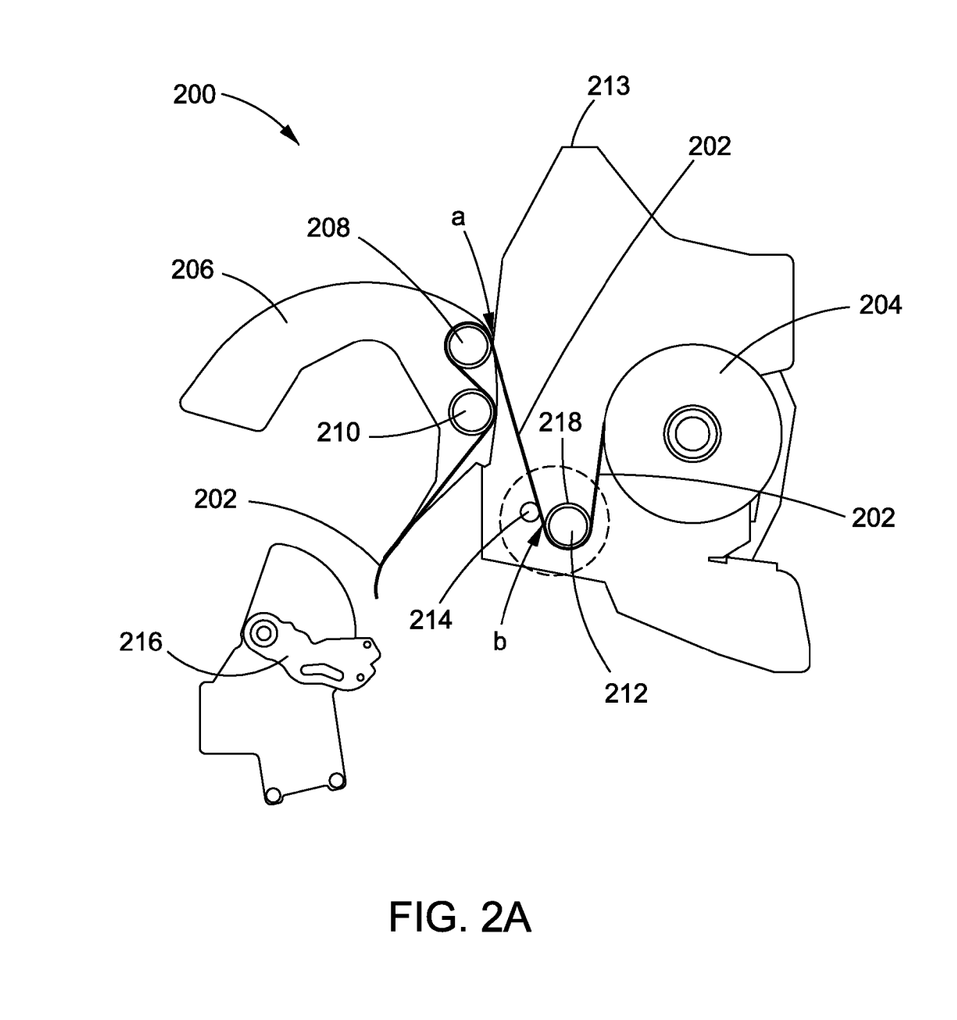
FIG. 2A is a cross-sectional view of an exemplary net wrapping system in a home position for use with embodiments of the present invention.
Figure 3A:
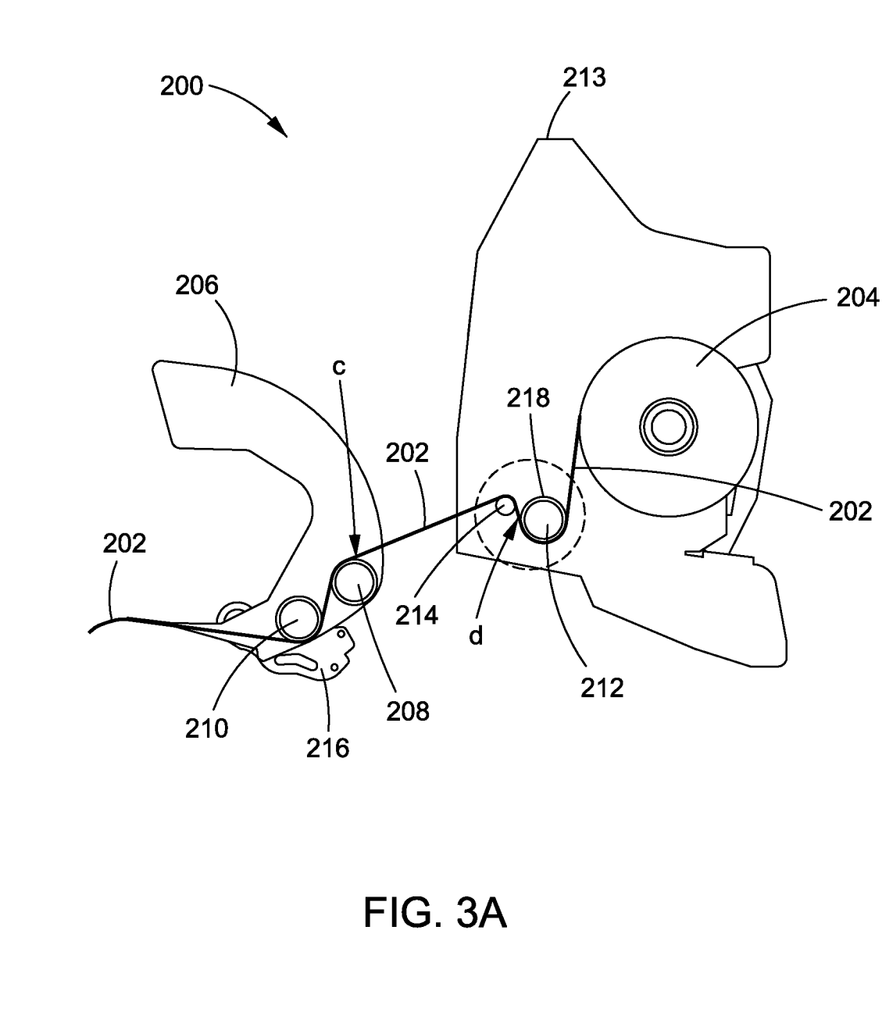
FIG. 3A is a cross-sectional view of an exemplary net wrapping system in an insert position for use with embodiments of the present invention.

Insertions assemblies may be used to insert net wrapping onto a bale. In some embodiments, insertion assemblies may be a duckbill assembly, such as duckbill assembly 206 shown at FIG. 2A and FIG. 3A. In other embodiments, insertions assemblies having geometries different than the duckbill assembly 206 shown at FIG. 2A and FIG. 3A may be used to insert net wrapping onto a bale. For simplicity, the embodiments described throughout include a duckbill assembly 206. FIG. 2A is a cross-sectional view illustrating an exemplary net wrapping system 200 having a duckbill assembly 206 in a home position. FIG. 3A is a cross-sectional view illustrating the exemplary net wrapping system 200 with the duckbill assembly 206 in an insert position.

A baler, such as baler 10 shown in FIG. 1, may include the net wrapping system 200 shown at the embodiment in FIG.

2A and FIG. 3A. The net wrapping system 200 may be configured to feed net wrapping 202 from a net roll 204 to the bale B (shown in FIG. 1). The net wrapping system 200 may include a duckbill assembly 206 having a top duckbill spreader roll 208 and a bottom duckbill spreader roll 210. The top duckbill spreader roll 208 and bottom duckbill spreader roll 210 are configured to engage the net wrapping 202 on respective circumferential surfaces and move with the duckbill assembly between the home position and the insert position. The geometry, locations and number of duck bill spreader rolls 208 and 210 shown in the embodiments at FIG. 2A and FIG. 3A is merely exemplary. Embodiments may include duck bill spreader rolls having different geometries, locations than the duck bill spreader rolls 208 and 210 shown in FIG. 2A and FIG. 3A. Further, duckbill assemblies may include any number of duck bill spreader rolls configured to move between a home position and an insert position.

The net wrapping system 200 may also include a net roll support assembly 213. The net roll support assembly 213 may include the net roll 204, a fixed spreader roll 212 that engages the net wrapping 202 proximate to the net roll 204 and a back wrap roll 214. Back wrap roll 214 is disposed proximate to the fixed spreader roll 212 and the top duckbill spreader roll 208. As shown in FIG. 2A and FIG. 3A, when the duckbill assembly moves between the home position and the insert position, back wrap roll 214 is configured to remain stationary with respect to the fixed spreader roll 208 while the duck bill spreader rolls 208 and 210 move with respect to fixed spreader roll 212 and the back wrap roll 214.

Some embodiments may include back wrap rolls having a smooth surface. In other embodiments, back wrap rolls may include non-smooth surfaces such as textured or spiraled surfaces. In some embodiments, back wrap rolls may include smooth surfaces that feed net wrapping to insertion assembly spreader rolls having textured or spiraled surfaces.

The net wrapping system 200 may further include knife assembly 216 positioned proximate to an end of the duck bill assembly 208 and configured to cut the net wrapping 202 after the net wrapping 202 has been bound onto the bale B.

Figure 2B:
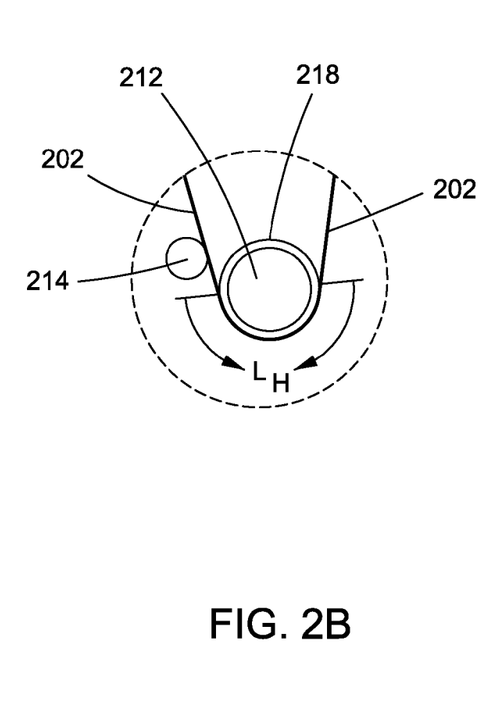
FIG. 2B is a close-up view of the fixed spreader roll and backdrop roll shown in FIG. 2A for use with embodiments of the present invention.

While the duck bill assembly 206 is in the home position shown at FIG. 2A, the net wrapping 202 is fed through the net wrapping system 200 but the net wrapping 202 is not bound onto the bale B. As shown in FIG. 2A, when the duck bill assembly 206 is in the home position, the net wrapping 202 first engages the fixed spreader roll 212 on a fixed spreader roll circumferential surface 218, passes by and does not engage back wrap roll 214, then engages top duckbill spreader roll 208 and bottom duckbill spreader roll 210 before proceeding to knife assembly 216 and bale B (shown in FIG. 1). FIG. 2B is a close-up view of the fixed spreader roll 212 and backdrop roll 214 shown in FIG. 2A. As shown in this close-up view at FIG. 2B, fixed spreader roll 212 engages the net wrapping 202 with length $L_H$ of the fixed spreader roll circumferential surface 218.

Figure 3B:
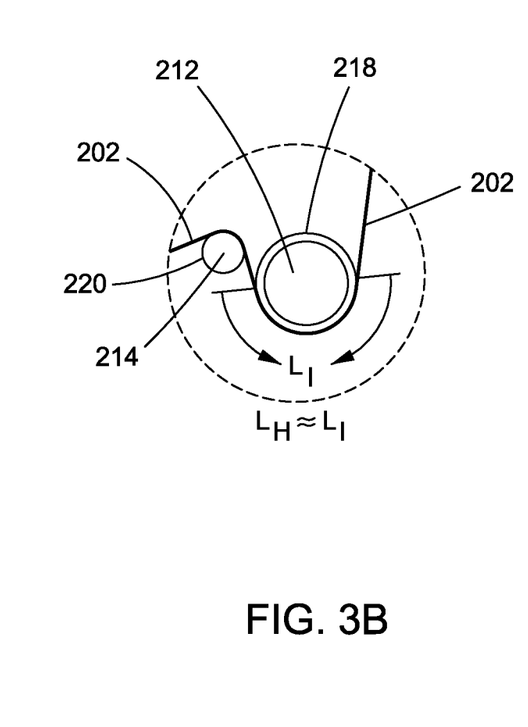
FIG. 3B is a close-up view of the fixed spreader roll and backdrop roll shown in FIG. 3A for use with embodiments of the present invention.

In some embodiments, the back wrap roll 214 may be configured to cause the net wrapping to maintain engagement along substantially the same length of the fixed spreader roll circumferential surface 218 when the duckbill assembly 206 is in the insert position. For example, as shown in FIG. 3A, when the duck bill assembly 206 is moved to the insert position, the top duckbill spreader roll moves downward with respect to the fixed spreader roll 212 and the net wrapping moves downward. When net wrapping moves downward, back wrap roll circumferential surface 220 of back wrap roll 214 is configured to engage the net wrapping 202, causing the net wrapping 202 to engage the fixed spreader roll 212 with length $L_I$ (shown at FIG. 3B) of the fixed spreader roll circumferential surface 218. In the embodiment shown in the close-up view at FIG. 3B, the length $L_1$ may be substantially the same as length $L_H$. In some aspects, length $L_1$ may be within a predetermined threshold length from length $L_H$ and may vary, depending on factors such as the geometry of back wrap rolls and fixed spreader roll and the location of back wrap rolls and fixed spreader rolls with respect to each other. In other embodiments, the length $L_1$ may be equal to length $L_H$.

Figure 4:
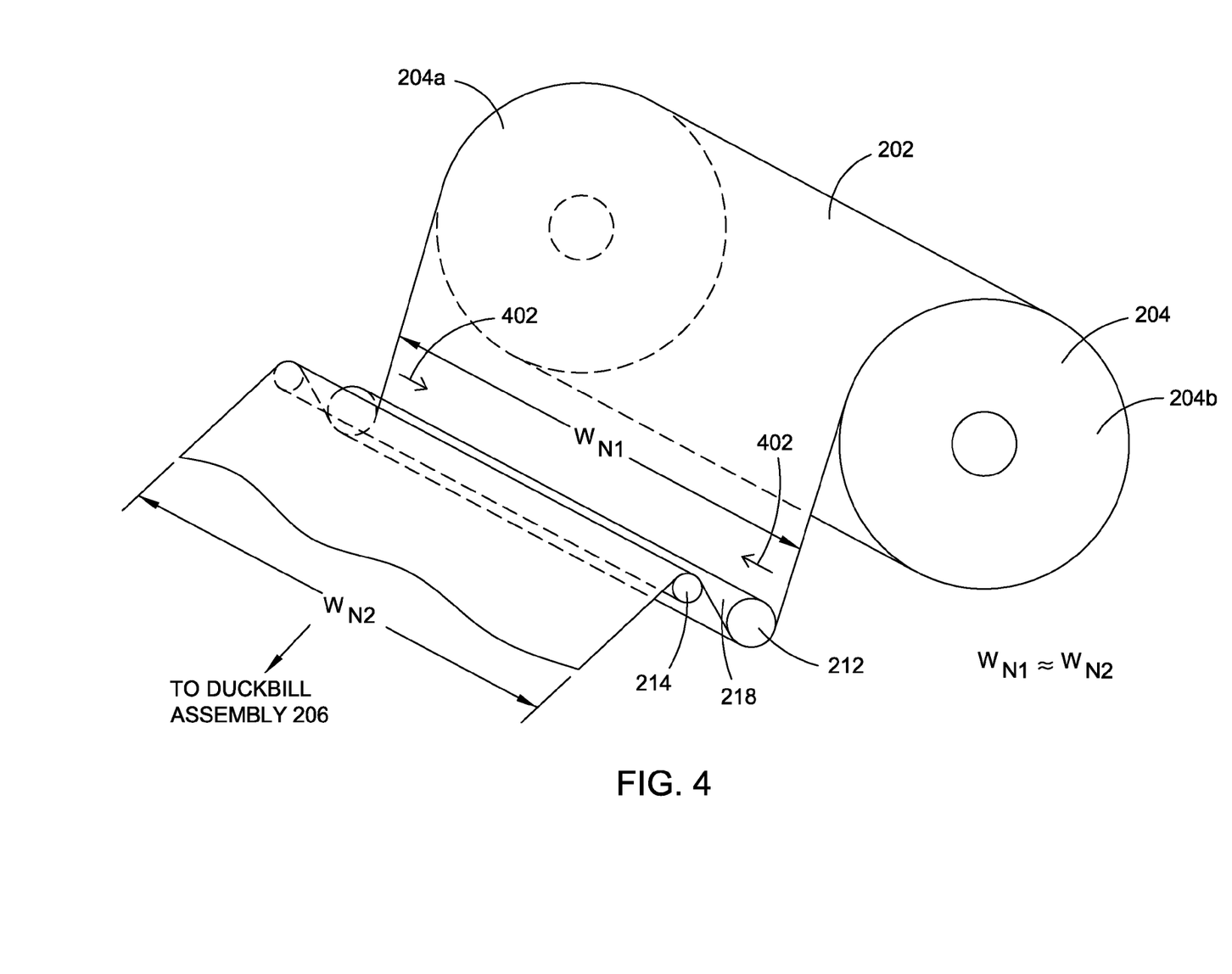
FIG. 4 is a perspective view of a portion of the net wrapping system shown in FIG. 2A for use with embodiments of the present invention.

If the length $L_1$ is not within a predetermined threshold length from of length $L_H$, the net wrapping 202 may be caused to move inward, indicated by the arrows 402 in FIG. 4. If the length $L_1$ is within a predetermined threshold length from length $L_H$, the back wrap roll 212 may be configured to cause the net wrapping 202 to maintain a net wrapping width ($W_{N1}$ and $W_{N2}$) as the net wrapping 202 traverses a net path between the net roll 204 and the bale B. For example, as shown in FIG. 2A, the net wrapping 204 traverses a path between the net roll 204 and the bale B (shown in FIG. 1) when the duckbill assembly is in the home position. FIG. 4 is a perspective view of a portion of the net wrapping system 200 shown at FIG. 2A. As shown at FIG. 4, as the net wrapping 202 is dispensed from the net roll 204, net wrapping 202 includes a net wrapping width $W_m$ extending from one end 204a of the net roll 204 to an opposing end 204b of the net roll 204. Because the back wrap roll 214 is configured to cause the length $L_I$ to be substantially the same as length $L_H$, causing the net wrapping 202 to maintain the net wrapping width $W_N$ as the net wrapping 202 traverses a net path between the net roll 204 and the bale B. For example, as shown at FIG. 4, the net wrapping width $W_{N2}$ of net wrapping 202 when net wrapping 202 has passed back wrap roll 214 is substantially the same as the net wrapping width $W_{N1}$ when net wrapping 202 is between net roll 204 and fixed spreader roll 212.

In some embodiments, the length $L_H$ and the length $L_I$ may be measured in degrees. For example, the length $L_H$ and the length $L_I$ of the fixed spreader roll circumferential surface 218 that is engaged with the net wrapping 202 may range from about 90 degrees of rotation to about 200 degrees of rotation to cause net wrapping 202 to maintain the net wrapping width $W_N$ as the net wrapping 202 traverses a net path between the net roll 204 and the bale B. In some embodiments, the length $L_H$ and the length $L_I$ of the fixed spreader roll circumferential surface 218 that is engaged with the net wrapping 202 may be about 180 degrees. In other embodiments, the length $L_H$ and the length $L_I$ may cause net wrapping 202 to maintain the net wrapping width $W_N$ as the net wrapping 202 traverses a net path between the net roll 204 and the bale B. In other embodiments, length $L_H$ and the length $L_I$ may be measured in other units (e.g., radians, millimeters) different than degrees.

In some embodiments, it may be desirable to maintain a length of the net wrapping 202 when the duckbill assembly is moved between the home position and the insert position. If a back wrap roll is located further to the right and/or above (e.g., further to the top of the fixed spreader roll 212) the back wrap roll 214 shown in FIG. 2A through FIG. 3B, net wrapping 202 may be caused to travel a greater distance in the insert position. If the net wrapping 202 is caused to travel a greater distance when the duck bill 206 is in the insert position than when the duck bill 206 in the home position, the net wrapping 202 may be pulled out of the duck bill 206 as the duck bill 206 moves to the insert position. Because the duck bill 206 may not have the ability to pull net wrapping 202 off of the net roll 204, the net roll 204 may pull the net wrapping 202 out of the duck bill 206 when the duck bill 206 moves to the insert position. Therefore, the net wrapping 202 may not start on the bale B.

According to some embodiments, the position of the back wrap roll 214 with respect to the fixed spreader roll 212 as shown at FIG. 2A through FIG. 3B may cause the net wrapping 202 to maintain a net wrapping length when the duckbill assembly is moved between the home position and the insert position. For example, the back wrap roll 214 may be located with respect to the fixed spreader roll as shown at FIG. 2A through FIG. 3B to maintain the length of the net wrapping 202 when the duckbill assembly is moved between the home position and the insert position.

The location of back wrap roll 214 shown at FIG. 2A causes a first net wrapping length extending from the fixed spreader roll 214 (indicated by point b in FIG. 2A) to the duck bill assembly 206 (indicated by point a in FIG. 2A) when the duckbill assembly 206 is in the home position. The location of back wrap roll 214 shown at FIG. 3A causes a second net wrapping length extending from the fixed spreader roll 214 (indicated by point d in FIG. 2A) to the duck bill assembly 206 (indicated by point c in FIG. 2A) when the duckbill assembly is in the insert position. As shown, the second net wrapping length in FIG. 3A remains substantially the same as the first net wrapping length in FIG. 2A.

In some embodiments, the second net wrapping length may remain substantially the same as the first net wrapping length if the second net wrapping length is equal to or less than a predetermined net wrapping length threshold from the first net wrapping length. In one aspect, the threshold may be based on the net wrapping 202 being pulled out of the duck bill 206. For example, if the second net wrapping length is greater than the net wrapping length threshold, the net roll 204 causes the net wrapping 202 to be pulled out of the duck bill 206 when the duck bill 206 moves to the insert position. The predetermined net wrapping length threshold may vary depending on factors such as the geometry and the location components with respect to each other.

The geometry, locations and the scale of the components of the net wrapping assembly 200, such as the fixed spreader roll 212 and the back wrap roll 214 shown in FIG. 2A through FIG. 4 are merely exemplary. Other embodiments may include components having different geometries and locations with respect to each other than the components of the net wrapping assembly 200 shown in FIG. 2A through FIG. 4.

Figure 5:
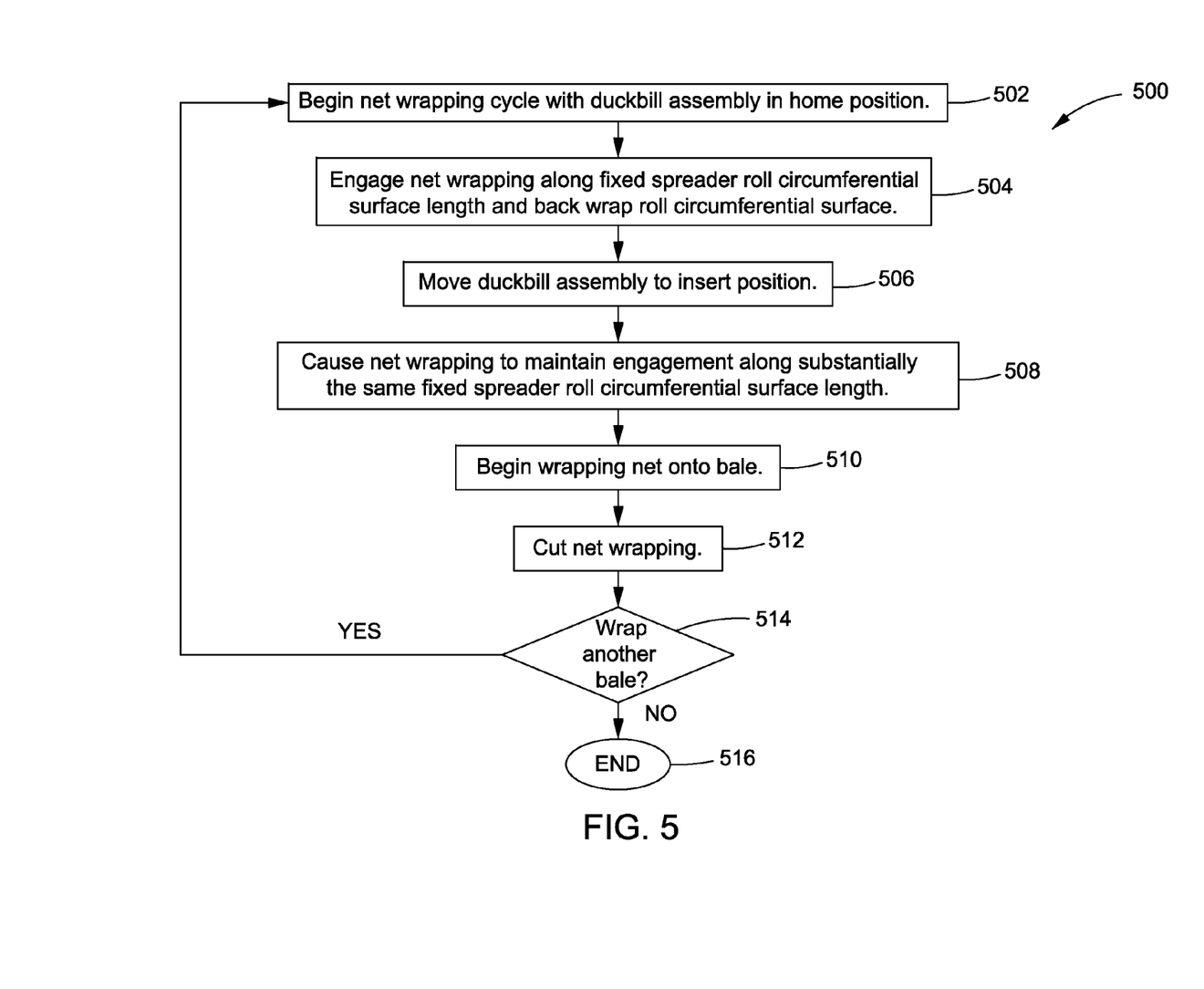
FIG. 5 is a flow chart illustrating an exemplary method of operating a net wrapping system in a baler for use with embodiments of the present invention.

FIG. 5 is a flow chart illustrating a method 500 of operating a net wrapping system 200 in a baler. As shown at block 502, a net wrap cycle may begin while a duckbill assembly 206 and at least one duckbill spreader roll, such as spreader rolls 208 and 210, are in a home position, such as the position shown in FIG. 2A. When the duckbill assembly 206 is in the home position, the net wrapping 202 is not bound onto bale B.

As shown at block 504, net wrapping 202 may traverse a net path from net roll 204, engaging fixed spreader roll circumferential surface 218 along length $L_H$ and then engaging a circumferential surface 220 of back wrap roll 214 that is disposed along the path of the net wrapping 202 between the fixed spreader roll 212 and top duckbill spreader roll 208.

As shown at block 506, the method may include moving the duckbill assembly 206 and the duckbill spreader rolls 208 and 210 to an insert position such as the position shown in shown at FIG. 3A. After the duck bill is moved to the insert position, the net wrapping 202 may be caused to maintain engagement along substantially the same fixed spreader roll circumferential surface length when the duckbill assembly 206 is in the insert position, as shown at block 508. For example, when the duck bill assembly 206 is in the insert position, the top duckbill spreader roll moves downward with respect to the fixed spreader roll 212 and the net wrapping moves downward. When net wrapping moves downward, back wrap roll circumferential surface 220 of back wrap roll 214 may be configured to engage the net wrapping 202, causing the fixed spreader roll 212 to engage the net wrapping 202 with length $L_I$ (shown at FIG. 3B) of the fixed spreader roll circumferential surface 218. As shown in the close-up view at FIG. 3B, the length $L_I$ may be substantially the same as length $L_H$.

In some embodiments, when the length $L_I$ is substantially the same as length $L_H$, the net wrapping 202 may maintain a net wrapping width $W_N$ as the net wrapping traverses a net path between the net roll 204 and the bale B. For example, as shown at FIG. 4, the net wrapping width $W_{N2}$ of net wrapping 202 when net wrapping 202 has passed back wrap roll 214 may be caused to be substantially the same as the net wrapping width $W_{N1}$ when net wrapping 202 is between net roll 204 and fixed spreader roll 212.

At block 510, the net wrapping 202 may begin to wrap around bale B until the net wrapping 202 is cut at block 512, ending the wrap cycle.

As shown at decision point 514, it may be determined whether another bale is to be wrapped. If it is determined that another bale is to be wrapped, the next net wrap cycle begins at block 502. If it is determined that another bale is not to be wrapped, the method ends at 516.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A baler comprising:
   a bale chamber configured to house a bale; and
   a net wrapping system configured to feed net wrapping from a net roll to the bale, the net wrapping system comprising:
   an insertion assembly configured to move between a home position and an insert position, the insertion assembly having at least one insertion assembly spreader roll configured to engage the net wrapping on an insertion spreader roll circumferential surface and move with the insertion assembly between the home position and the insert position;
   a fixed spreader roll proximate to the net roll and having a fixed spreader roll circumferential surface, the fixed spreader roll configured to engage the net wrapping along a length of the fixed spreader roll circumferential surface when the insertion assembly is in the home position; and
   a back wrap roll located along a net path between the fixed spreader roll and the at least one insertion assembly spreader roll and configured such that the length of a piece of net wrapping that is engaged with the fixed spreader roll is substantially maintained when the insertion assembly is in the insert position;
   wherein the back wrap roll is configured to: (i) increase an engaging area from the net wrapping with a back wrap roll circumferential surface when the insertion assembly is moved to the insert position; and (ii) decrease the engaging area from the net wrapping when the insertion assembly is moved from the insert position to the home position.

2. The baler of claim 1, wherein
the net wrapping comprises a net wrapping width extending from one end of the net roll to an opposing end of the net roll,
the net wrapping traverses a path between the net roll and the bale when the insertion assembly is in the home position, and
the back wrap roll is configured to cause the net wrapping to maintain the net wrapping width as the net wrapping traverses the path between the net roll and the bale when the insertion assembly is in the home position.

3. The baler of claim 1, wherein the rotational range of the fixed spreader roll circumferential surface that is engaged with the net wrapping is from 90 degrees to 200 degrees.

4. The baler of claim 3, wherein the rotational range of the fixed spreader roll circumferential surface that is engaged with the net wrapping is from 150 degrees to 180 degrees.

5. The baler of claim 1, wherein the back wrap roll is further configured to cause a second net wrapping length extending from the fixed spreader roll to the insertion assembly when the insertion assembly is in the insert position to remain substantially the same as a first net wrapping length extending from the fixed spreader roll to the insertion assembly when the insertion assembly is in the home position.

6. The baler of claim 5, wherein the second net wrapping length remains substantially the same as the first net wrapping length when the second net wrapping length is equal to or less than a predetermined net wrapping length threshold from the first net wrapping length.

7. A net wrapping system comprising:
an insertion assembly configured to move between a home position and an insert position, the insertion assembly having at least one insertion assembly spreader roll configured to engage net wrapping from a net roll on an insertion spreader roll circumferential surface and move with the insertion assembly between the home position and the insert position;
a fixed spreader roll proximate to the net roll and having a fixed spreader roll circumferential surface, the fixed spreader roll configured to engage the net wrapping along a length of the fixed spreader roll circumferential surface when the insertion assembly is in the home position; and
a back wrap roll located along a net path between the fixed spreader roll and the at least one insertion assembly spreader roll
wherein the back wrap roll is configured to: (i) increase an engaging area from the net wrapping with a back wrap roll circumferential surface when the insertion assembly is moved to the insert position; and (ii) decrease the engaging area from the net wrapping when the insertion assembly is moved from the insert position to the home position.

8. The net wrapping system of claim 7, wherein
the net wrapping comprises a net wrapping width extending from one end of the net roll to an opposing end of the net roll,
the net wrapping traverses a path between the net roll and the bale when the insertion assembly is in the home position, and
the back wrap roll is configured to cause the net wrapping to maintain the net wrapping width as the net wrapping traverses the path between the net roll and the bale when the insertion assembly is in the home position.

9. The net wrapping system of claim 7, wherein the back wrap roll has a smooth surface.

10. The net wrapping system of claim 7, wherein the rotational range of the fixed spreader roll circumferential surface that is engaged with the net wrapping is from 150 degrees to 180 degrees.

11. The net wrapping system of claim 7, the back wrap roll is further configured to cause a second net wrapping length extending from the fixed spreader roll to the insertion assembly when the insertion assembly is in the insert position to remain substantially the same as a first net wrapping length extending from the fixed spreader roll to the insertion assembly when the insertion assembly is in the home position.

12. The net wrapping system of claim 11, wherein the second net wrapping length remains substantially the same as the first net wrapping length when the second net wrapping length is equal to or less than a predetermined net wrapping length threshold from the first net wrapping length.

13. A method of operating a net wrapping system having an insertion assembly with at least one insertion assembly spreader roll in a baler, the method comprising:
engaging net wrapping with: (i) a fixed spreader roll along a fixed spreader roll circumferential surface length and (ii) a circumferential surface of a back wrap roll located along a net path between the fixed spreader roll and the at least one insertion assembly spreader roll;
moving the insertion assembly and the at least one insertion assembly spreader roll to an insert position;
causing the net wrapping to maintain engagement along substantially the same fixed spreader roll circumferential surface length when the insertion assembly is in the insert position;
increase an engaging area of the net wrapping with the back wrap roll circumferential surface when the insertion assembly is in the insert position; and
reducing the engaging contact of the net wrapping from the back wrap roll circumferential surface when the insertion assembly is moved from the insert position to a home position.

14. The method of claim 13, further comprising causing the net wrapping to maintain a net wrapping width as the net wrapping traverses a path between the net roll and the bale.

15. The method of claim 13, further comprising causing a second net wrapping length extending from the fixed spreader roll to the insertion assembly when the insertion assembly is in the insert position to remain substantially the same as a first net wrapping length extending from the fixed spreader roll to the insertion assembly when the insertion assembly is in the home position.

* * * * *